United States Patent [19]

Otokawa et al.

[11] Patent Number: 4,825,307

[45] Date of Patent: Apr. 25, 1989

[54] INFORMATION SIGNAL RECORDING APPARATUS

[75] Inventors: Mitsuhiro Otokawa; Hiroyuki Takimoto, both of Kanagawa; Keiji Satoh, Tokyo; Koji Takahashi, Kanagawa; Hiroo Edakubo, Tokyo, all of Japan

[73] Assignee: Canon Kabushiki Kaisha, Tokyo, Japan

[21] Appl. No.: 912,586

[22] Filed: Sep. 26, 1986

[30] Foreign Application Priority Data

Sep. 30, 1985 [JP] Japan .................. 60-214831
Oct. 4, 1985 [JP] Japan .................. 60-220273

[51] Int. Cl.⁴ .............................. G11B 5/024
[52] U.S. Cl. .......................... 360/27; 360/60; 360/66
[58] Field of Search ............... 360/60, 61, 62, 64, 360/66, 14.1, 14.2, 18, 27

[56] References Cited

U.S. PATENT DOCUMENTS

| | | | |
|---|---|---|---|
| 3,342,949 | 4/1963 | Wessels | 360/14.1 |
| 3,896,489 | 7/1975 | Rudert et al. | 360/62 |
| 3,939,491 | 2/1976 | Shigeta | 360/14.1 |
| 4,071,856 | 1/1978 | Kihara et al. | 360/64 |
| 4,442,463 | 4/1984 | Krishnamurty et al. | 360/66 |
| 4,455,582 | 6/1984 | Yanagida et al. | 360/66 |
| 4,486,792 | 12/1984 | Edakubo et al. | . |
| 4,496,998 | 1/1985 | Takimoto | . |
| 4,536,805 | 8/1985 | Maeda | . |
| 4,550,345 | 10/1985 | Terada et al. | 360/27 |
| 4,554,602 | 11/1985 | Tobe | . |
| 4,587,580 | 5/1986 | Tanayama et al. | . |
| 4,599,660 | 7/1986 | Kozuki et al. | . |
| 4,691,251 | 8/1987 | Ookawa et al. | 360/14.1 |

OTHER PUBLICATIONS

Japanese Patent Abstract 5396805, 8-1978, Morio, 8.24.1978.

Primary Examiner—Alan Faber
Assistant Examiner—Kevin J. Fournier
Attorney, Agent, or Firm—Robin, Blecker & Daley

[57] ABSTRACT

An information signal recording apparatus having a rotary recording head and a rotary erase head is arranged to control timing for a start of recording by the recording head on the basis of the reproduction output of the rotary erase head.

18 Claims, 7 Drawing Sheets

INFORMATION SIGNAL RECORDING APPARATUS

BACKGROUND OF THE INVENTION

1. Field of the Invention:

This invention relates to an information signal recording apparatus and more particularly to an information signal recording apparatus having a rotary or flying erase head (hereinafter referred to as FEH for short).

2. Description of the Related Art:

Heretofore, it has been practiced that, when an information signal such as a video signal or the like is recorded by a rotary head, a control signal (hereinafter referred to as CTL signal) is recorded by a control head (hereinafter referred to as CTL head) by forming a recording track on a tape-shaped recording medium in the longitudinal direction of the medium in addition to helical recording tracks formed by the rotary head. This is called the CTL method. The conventional rotary head type information signal recording and reproducing apparatus operating by the CTL method is arranged to determine timing for the start of recording by using a reproduced CTL signal in carrying out the so-called concatenated recording, i.e. recording continuously from a part already recorded. Meanwhile, a recording and reproducing apparatus of another kind performing tracking control by the so-called four-frequency method must be arranged differently from the apparatus performing tracking control by the CTL method. The tracking control by the above-stated four-frequency method is as briefly described below:

FIG. 1 of the accompanying drawings shows a pattern of magnetized recording tracks formed by a video tape recorder (hereinafter referred to as VTR) of the kind performing tracking control by the four-frequency method. FIG. 2 is a block diagram showing the essential parts of a tracking error signal processing circuit employed in the conventional VTR. Referring to FIG. 1, a magnetic tape 1 is arranged to be moved in the direction of arrow 2. Recording tracks A1, B1, A2, B2, ---are formed with signals recorded by heads A and B which have azimuth angles different from each other. An arrow 3 indicates the scanning direction of the heads. In recording tracks 4 are recorded along with a video signal pilot signals of four different frequencies f1 to f4. One of the pilot signals is recorded for every field, or one in each of the tracks in rotation. The sequence in which the pilot signals are recorded is as shown in FIG. 1. For example, the pilot signal of frequency f1 which is 102.5 KHz≈6.5 fH is recorded in the recording track A1; the pilot signal of frequency f2 which is 118.9 KHz≈7.5 fH is recorded in the track B1; the pilot signal of frequency f3 which is 165.2 KHz≈10.5 fH in the track A2; and the pilot signal of frequency f4 which is 148.7 KHz≈9.5 fH in the track B2 (fH being the frequency of a horizontal synchronizing signal). These pilot signals are recorded in a state of being superimposed on a video signal. The frequency difference between the pilot signals recorded in adjacent recording tracks is either fH or 3 fH as shown in FIG. 1. When the head is scanning the tracks Ai (i: 1, 2, 3, ---), the frequency difference is always fH between the pilot signal of the track being mainly scanned and that of the adjoining track on the right-hand side and always 3 fH between the pilot signal of the track and that of the adjoining track on the left-hand side. Further, when the head is scanning the tracks Bi (i: 1, 2, 3, ---), the frequency difference is always 3 fH between the pilot signal of the track being scanned and that of the adjoining track on the right-hand side and always fH between the pilot signal of the track being scanned and that of the adjoining track on the left-hand side.

Since the frequencies f1 to f4 of the pilot signals are relatively low, the pilot signals recorded in the adjacent tracks other than the track being mainly scanned can be reproduced by the head as cross-talks even in the event of azimuth recording. Assuming that the head is mainly scanning the track A2, the pilot signal thus detected is a composite signal including components of frequencies f4, f2 and f3. In case that the center of the tracing locus of the head precisely coincides with the center line of the track which is mainly scanned under the tracking control, i.e. in the case of on-track, the pilot signals (of frequencies) f2 and f4 of the neighboring tracks are reproduced at even levels. However, the level of the frequency component f4 becomes higher than that of the other frequency component f2 when the position of the head slightly deviates from the center line of the track A2 toward the track B2 and lower than that of the component f2 when the position of the head deviates toward the track B1.

Therefore, with difference signals which represent the frequency differences fH and 3 fH between the pilot signal recorded in the mainly scanning track and the pilot signals recorded in the two neighboring tracks separately taken out, the deviating direction and the deviating degree of the head from the main scanning track are obtainable by comparing the levels of these two difference signals.

FIG. 2 shows in a block diagram the circuit arrangement of the VTR operating by the four-frequency method described above. Referring to FIG. 2, a reproduced signal consisting of a video signal and the pilot signals which are superimposed on each other comes from a terminal 5 to a low-pass filter (LPF) 6. The LPF 6 then separates the pilot signal component from the incoming reproduced signal. A multiplier 8 is arranged to perform a multiplying operation on the pilot signal component and a local pilot signal which is generated by a local pilot signal generating circuit 7. The circuit 7 is arranged to produce a pilot signal of the same frequency as that of the pilot signal recorded in the mainly scanning track. Then, since as mentioned above with reference to FIG. 1, the output of the LPF includes the frequency components f2, f4 and f3 with the track A2 assumed to be mainly scanned, the local pilot signal has the frequency f3 in this instance. Therefore, the multiplier 8 produces a signal having frequencies representing the sum of and a difference between the frequency f3 and the frequency components f2, f4 and f3. A band-pass filter (BPF) 9 is arranged to take out only a signal of frequency fH from the sum and difference signal while another BPF 10 is arranged to take out a signal of frequency 3 fH. The outputs of these BPFs are supplied to detection circuits 11 and 12 for detection and rectification.

The signal components fH and 3 fH which are thus obtained from the circuits 11 and 12 are then supplied to a level comparison circuit 13. The circuit 13 then produces a signal representing a level difference thus obtained. More specifically, when the reproduced level of the signal fH is higher than that of the signal 3 fH, a positive potential corresponding to the level difference is obtained. A negative potential is obtained in the opposite case. By this a signal including information on the track deviating degree and track deviating direction of the head is produced and can be used as a tracking error signal.

Under this condition, the relation between the deviating direction and the tracking error signal obtained for the track A1 becomes reverse to the relation obtained for another track B1 as mentioned in the foregoing with reference to FIG. 1. To solve this problem, a switching circuit 16 is arranged behind the level comparison circuit 13 to have the output of the comparison circuit 13 selectively produced either through an inverting amplifier 14 or not through the amplifier 14 in accordance with a head switch-over signal 15.

Some of the VTR employing the above-stated four-frequency method, such as the known 8 mm VTR, is arranged to have different tape moving speed modes for recording and reproduction including a mode in which tape is allowed to travel at a standard speed (hereinafter referred to as the SP mode), a mode in which the tape is allowed to travel at a speed ½ of the SP mode (hereinafter referred to as the LP mode) and another mode in which the tape is allowed at a speed ⅓ of the SP mode (hereinafter referred to as the EP mode) for example. In performing the so-called concatenated recording with such a VTR, it is difficult to appositely determine timing for the start of recording when the tape speed is switched from one speed to another. In other words, in carrying out cancatenated recording in the manner generally practiced, the tape is rewound to an extent corresponding to a given number of tracks and, after that, recording is allowed to begin at a point of time at which the tape has been allowed to travel to the extent corresponding to the given number of tracks. In that instance, an existing record tends to be left unrecorded. Thus, it has been difficult to make the recorded pattern of an information signal adequately continuous.

SUMMARY OF THE INVENTION

It is a general object of this invention to solve the problem of the prior art described above.

It is a more specific object of this invention to provide an information signal recording apparatus which is capable of making the record pattern of an information signal appositely continuous in carrying out concatenated recording.

It is another more specific object of this invention to provide an information signal recording apparatus which is capable of having an ideal recording start timing by detecting the end part of an existing record prior to the start of recording.

Under this object, an information signal recording apparatus arranged according to this invention as an embodiment thereof comprises: a first rotary head which is arranged to record an information signal on a recording medium; a second rotary head which is arranged to erase the information signal recorded on the recording medium; and determining means for determining timing for the start of recording the information signal by the first rotary head on the basis of a signal reproduced by the second rotary head.

It is a further specific object of this invention to provide an information signal recording apparatus which is capable of adequately connecting an additional record pattern even in case that the track pitch of an existing record part differs from a track pitch at which additional recording tracks are to be formed.

Under that object, an apparatus arranged according to this invention as another embodiment thereof to record pilot signals of a plurality of different kinds in recurrent rotation along with an information signal, one in every recording track, comprises: a rotary head arranged to record the information signal on a recording medium; first control means for controlling the position of the rotary head and that of the recording medium relative to each other to have the middle part of the rotary head trace the center line of an applicable track on the recording medium by using the pilot signals reproduced by the rotary head; and second control means for controlling the position of the rotary head and that of the recording medium relative to each other to have the middle part of the rotary head trace the medium in a position shifted from the center line of the track by using the pilot signals reproduced by the rotary head.

Further objects and features of this invention will become apparent from the following detailed description of preferred embodiments thereof taken in connection with the accompanying drawings.

DETAILED DESCRIPTION OF THE PREFERRED EMBODIMENTS

Figure 1:
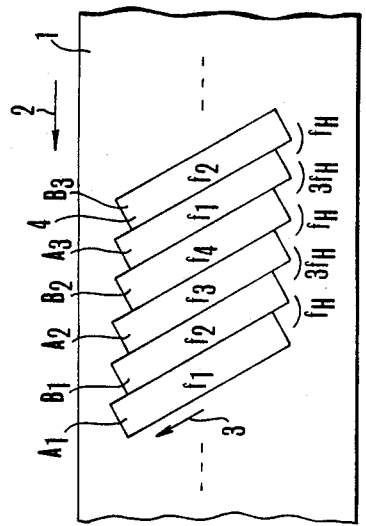
FIG. 1 is an illustration of magnetized recording tracks formed by a VTR arranged to perform tracking control by the four-frequency method.
Figure 2:
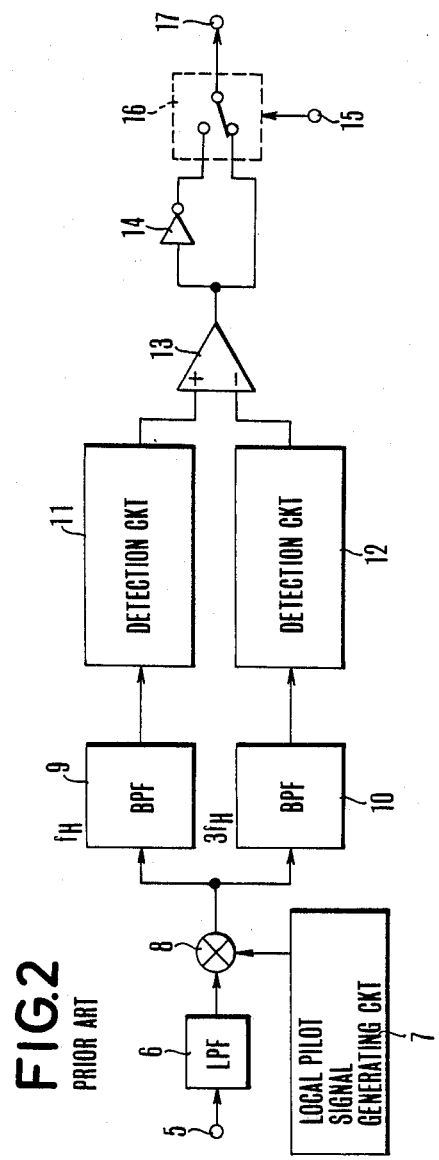
FIG. 2 is a block diagram showing the arrangement of the essential parts of the conventional tracking error signal processing circuit.
Figure 3:
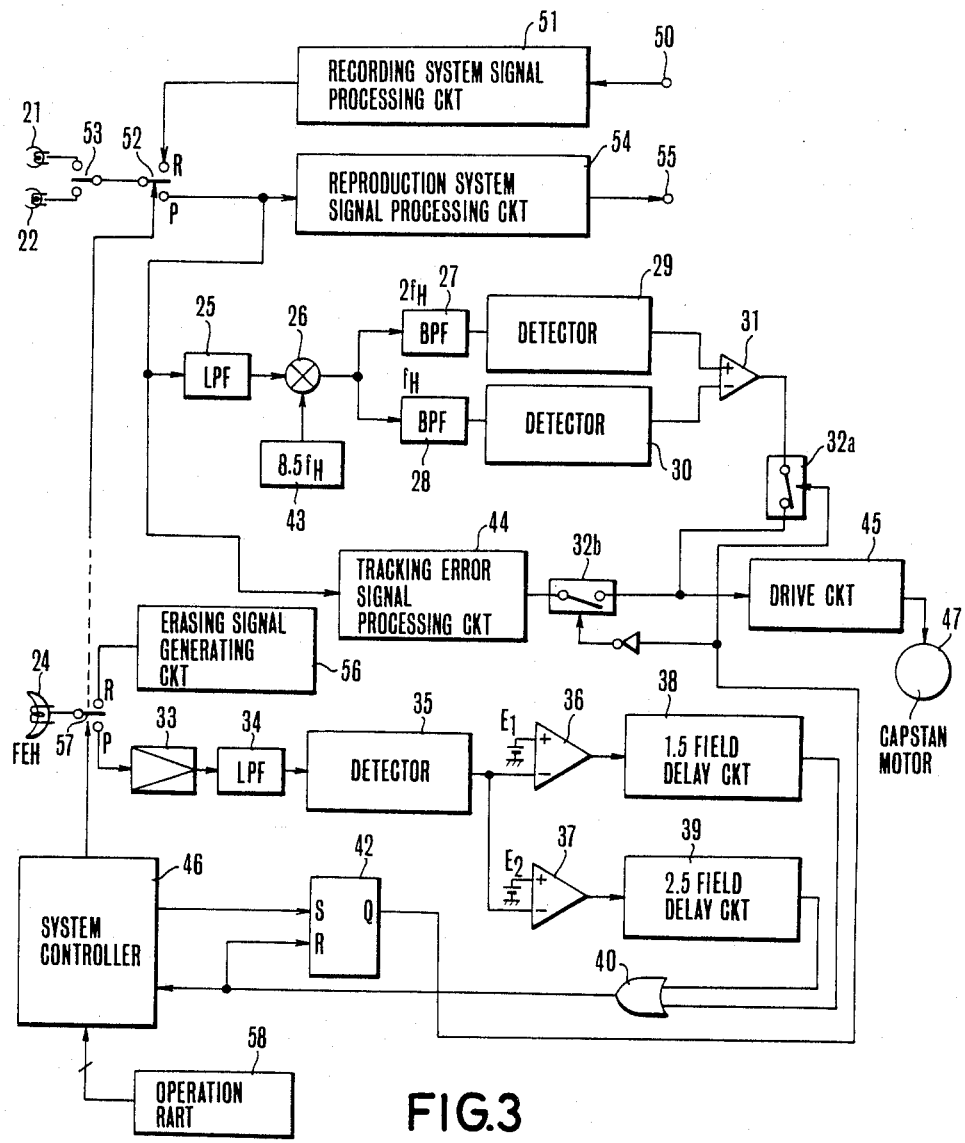
FIG. 3 is a diagram showing the circuit arrangement of a VTR arranged as an embodiment of this invention.

FIG. 3 is a circuit block diagram showing a VTR arranged as an embodiment of this invention. The illustration includes low-pass filters (LPFs) 25 and 34; a multiplier 26; band-pass filters (BPFs) 27 and 28; detectors 29, 30 and 35; differential amplifiers 31, 36 and 37; analog switches 32a and 32b; an amplifier 33; delay circuits 38 and 39; an OR gate 40; a flip-flop 42; a local pilot signal generator 43 which is arranged to generate a local pilot signal having a frequency of 8.5 fH; a tracking error signal processing circuit 44 which is arranged in an ordinary known manner as shown in FIG. 2; and a capstan motor drive circuit 45.

A system controller 46 is arranged to control the operation mode of the varied parts of the VTR. The VTR is provided with a capstan motor 47; an input terminal 50 for a video signal; a recording system signal processing circuit 51 which is arranged to process the incoming video signal into a signal form suited for magnetic recording; a switch 52 which has its connecting position on one side R in recording and on the other side P in the case of reproduction; a head change-over switch 53; a reproduction system signal processing circuit 54 which is arranged to bring a reproduced video signal back into a signal form suited for supply of it to an external monitor or the like; an output terminal 55 for producing the video signal to the outside; an erasing signal generating circuit 56; a recording/reproduction change-over switch 57 which is similar to the switch 52; and a manual operation part 58 including operation keys.

Figure 4A:
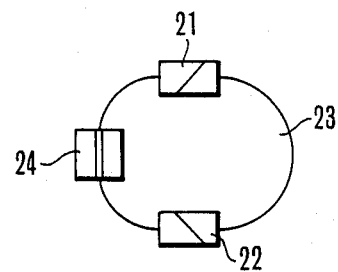
FIGS. 4(A) and 4(B) are illustrations schematically showing the head arrangement of the VTR of FIG. 3.
Figure 4B:
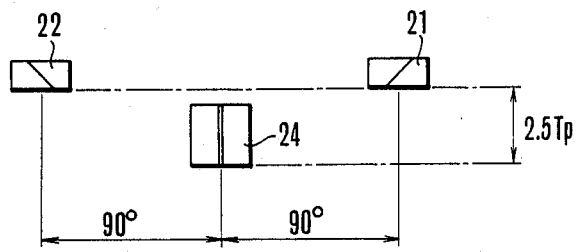

FIGS. 4(A) and 4(B) show the head arrangement of the VTR of FIG. 3. The illustrations of FIGS. 4(A) and 4(B) include recording-and-reproducing heads 21 and 22 which are mounted on a rotary drum 23 at a phase difference of 180 degrees; and an FEH 24 which is mounted at a phase difference of 90 degrees from the heads 21 and 22. Assuming that a track pitch obtained in the SP mode is $T_p$, the lower end of the FEH 24 is arranged to be away from other heads 21 and 22 on the rotary drum to an extent approximately corresponding to 2.5 $T_p$. As a result of this arrangement, the FEH 24 traces a part of the tape deviating to a given extent from the positions of other heads during recording and reproduction. This state of tracing is as shown in FIG. 5.

Figure 5:
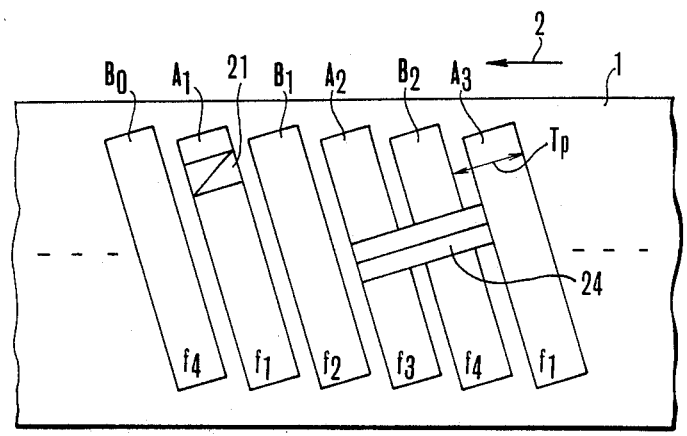
FIG. 5 shows the tape tracing manner of the VTR of FIG. 3.

Referring to FIG. 5, the recording/reproducing heads 21 and 22 are arranged to have such a head width that enables them to perform recording and reproduction in different modes including the SP mode and the LP mode. Because of this arrangement, a record pattern having some guard band is obtained in the SP mode.

Figure 6:
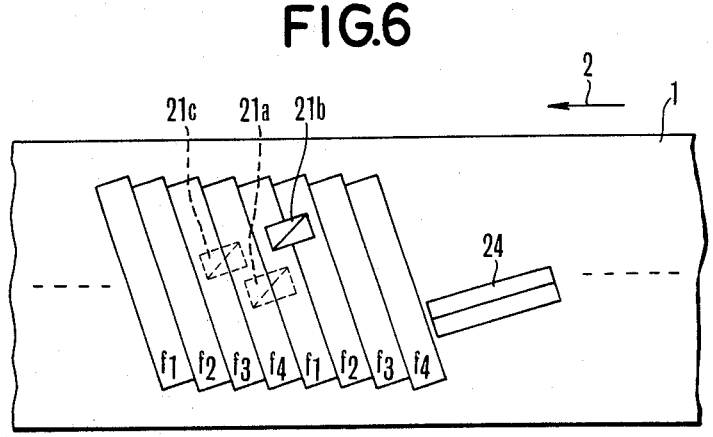
FIGS. 6 and 7 show the tape tracing manner of the same VTR of FIG. 3 as in performing concatenated recording.

The concatenated recording operation principle of this embodiment is as follows:

Let us assume that the VTR is now in pause of recording with a pause instruction input applied via the operation part 58 during recording in the LP mode by causing the tape 1 to travel in the direction of arrow 2 with the capstan motor 47. In this instance, the recording pattern on the tape becomes as shown in FIG. 6. Under this condition, the system controller 46 always brings recording to a stop at the field or track having the pilot signal frequency of f4. After the recording pause instruction key input, there obtains the so-called record review state. Under that condition, the tape is rewound to a small extent by allowing it to travel backward before bringing it to a stop. Then, the VTR is kept in pause until receipt of a next key input. When a pause cancelling key input is received under this condition, the system controller 46 instructs the capstan motor 47 to cause the tape to travel forward. The heads 21 and 22 are not allowed to perform recording while a portion of the tape having an existing record is passing them and are allowed to begin recording only when a non-recorded part of the tape comes to them.

Figure 8:
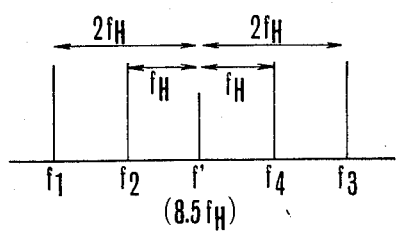
FIG. 8 shows the frequency of a single local pilot signal obtained in the circuit arrangement of FIG. 3.

In carrying out concatenated recording at a tape speed different from a speed at which the existing record of information signals is recorded, the embodiment operates as follows: First, let us assume that the concatenated recording is to be performed in the SP mode after an existing recording pattern formed in the LP mode. If a signal processing operation is performed by the ordinary four-frequency method with the tape allowed to travel at the speed prescribed for the SP mode, no tracking error signal can be obtained for a record pattern formed in the LP mode and the capstan servo remains inoperative. Therefore, let us now consider a pilot signal of a frequency f' which is 8.5 fH (fH: the frequency of a horizontal synchronizing signal) in addition to the four frequencies f1, f2, f3 and f4 as shown in FIG. 8. Assuming that the local pilot signal is of the frequency f' as shown in FIG. 8, the multiplication output obtained from the reproduced pilot signals and the local pilot signal contains a frequency component of 2 fH if the reproduced pilot signals are of frequencies f1 and f3 and a frequency component of fH in case that the reproduced pilot signals are of frequencies f2 and f4. Further, the heads 21 and 22 pick up without fail the reproduced pilot signals of two different frequencies within one field period even in the case of reproduction in the SP mode of signals recorded in the LP mode. The reproduced pilot signals from the heads 21 and 22 are taken out by the LPF 25; multiplied by the frequency f' as the local pilot signal; the output of the multiplier is supplied to the BPF 27 which passes only the frequency component of 2 fH and to the BPF 28 which passes only the frequency component of fH; the outputs of these BPFs are respectively supplied to the detectors 29 and 30 for detection; and, after that, the outputs of the detectors are supplied to the differential amplifier 31 to obtain a tracking error signal as shown in FIG. 3. In this instance, if the head is in a position 21a as shown in FIG. 6, the head is coming either toward a position 21b or another position 21c because:

With the head in the position 21a, if its position comes to deviate even to a slight degree toward a track in which the pilot signal of the frequency f1 is recorded, the amount of the component of 2 fH in the output of the multiplier 26 becomes greater than the other component fH. Then, the level of the tracking error signal increases. As a result, the capstan motor 47 causes the tape to travel at a higher speed. With the tape travelling at an increased speed, the tape tracing position of the head deviates further toward the track in which the pilot signal of the frequency f1 is recorded. The tracing position of the head is thus eventually shifted to the position 21b of FIG. 6 and is stabilized there.

Meanwhile, if the head position is deviating from the position 21a even to a slight degree toward another track in which the pilot signal of the frequency f4 is recorded, the capstan motor 47 causes the tape to travel at a lower speed. Then, the tracing position of the head deviates further toward the track in which the pilot signal of the frequency f4 is recorded until it is shifted to the position 21c and is stabilized there.

With tracking control performed for concatenated recording in the above-stated manner, the heads 21 and 22 stably perform tracking in a state of straddling the tracks in which the pilot signal frequencies f1 and f2 and other pilot signal frequencies f3 and f4 are respectively recorded. Each of these heads never comes to be in a state of straddling the tracks of f2 and f3 or f1 and f4. However, in this instance, the tracing locus of the head does not coincide with the direction of recording tracks. Therefore, an AC component having the same period as the tracing period of the head is obtained from the differential amplifier 31. The capstan motor 47 is incapable of following this AC component.

When the recording pause is cancelled by means of the operation part 58, the system controller 46 supplies a pulse signal to the S terminal of the flip-flop 43. Then, by this the Q output of the flip-flop 42 is set at a high level. The analog switch 32a turns on, the analog switch 32b turns off and the connecting position of the switch 52 is shifted to its side P. As a result, the tracking error signal produced from the differential amplifier 31 which receives the local pilot signal of the frequency f' is supplied to the drive circuit 45. At that time, the connecting position of the switch 57 is also shifted to its side P to bring the FEH 24 into a reproducing mode. Then, the reproduction output of the FEH 24 coming via the amplifier 33 is supplied to the detector 35 after the high frequency zone component thereof is cut by the LPF 34.

The reproduction signal is obtained from the FEH 24 when the FEH 24 is tracing a part of the tape having an existing record. In this instance, therefore, the output levels of both the differential amplifiers 36 and 37 become low. After this, with the FEH 24 in the reproducing mode and with the tape allowed to travel while the tracking error signal is being produced from the differential amplifier 31, there comes a time when the FEH 24 begins to trace a non-recorded part of the tape. The positions of the heads relative to each other at that point of time are as shown with full lines in FIGS. 6 and 7.

In the case of FIG. 6, the head 21 is in a position 21b with the tracking control being adequately accomplished. Under this condition, the whole width of the FEH 24 begins to trace the non-recorded part of the tape. Therefore, with a threshold voltage set at a value E1, the output levels of both the differential amplifiers 36 and 37 become high when there obtains the condition of FIG. 6. The phase relation between the head 21 and the FEH 24 is as shown in FIGS. 4 and 5. However, since there is a 1.5-field period before the head 21 comes to begin tracing the non-recorded part after the state shown in FIG. 6, a signal which is obtained by delaying the output of the amplifier 36 as much as the 1.5-field period is supplied via the OR gate 40 to the system controller 46 to bring the heads 21 and 22 into a recording mode. This arrangement ensures a smooth concatenation of recording.

Figure 7:
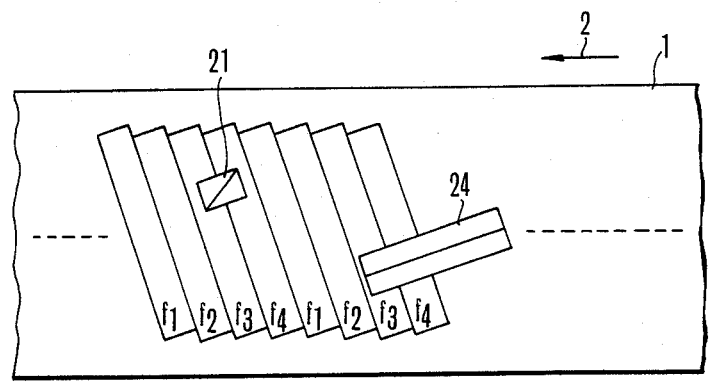

In case that the FEH 24 finds a non-recorded part while tracking control is adequately performed with the head 21 in a state of straddling the tracks in which the pilot signal frequencies f3 and f4 are recorded, the FEH begins to trace the tape with the half of its width covering the non-recorded part as shown in FIG. 7. Therefore, in the arrangement of FIG. 3, a threshold voltage which corresponds to this condition is set at a value E2. Then, in this instance, the output level of the differential amplifier 37 solely changes from a low level to a high level. In this instance, the concatenated recording process comes to an end by bringing the VTR into a recording mode after the lapse of a 2.5-field period. Therefore, the output of the differential amplifier 37 is delayed by the delay circuit 39 as much as the 2.5-field period before it is supplied via the OR gate 40 to the system controller 46 for bringing the VTR into the recording mode.

As mentioned in the foregoing, in the case of FIG. 6, the head 21 is straddling the tracks having the pilot signal frequencies f1 and f2 under adequate tracking control and the whole width of the FEH 24 is covering the non-recorded part. Meanwhile, in the case of FIG. 7, the head 21 is straddling the tracks having the pilot signal frequencies f3 and f4 under adequate tracking control and the half of the width of the FEH 24 is covering the non-recorded part. In either case, the output level of the differential amplifier 36 or 37 changes from a low level to a high level to have the flip-flop 42 reset via the OR gate 40 after the lapse of the 1.5-field period or the 2.5-field period. Then, the level of the Q output of the flip-flop 42 becomes low. As a result, the analog switch 32a turns off. The switch 32b turns on. The operation of the VTR then shifts to the normal tracking error signal processing operation. Further, the output of the OR gate 40 is supplied to the system controller 46. The controller brings the heads 21 and 22 into a recording state to have them smoothly perform concatenated recording.

Figure 9:
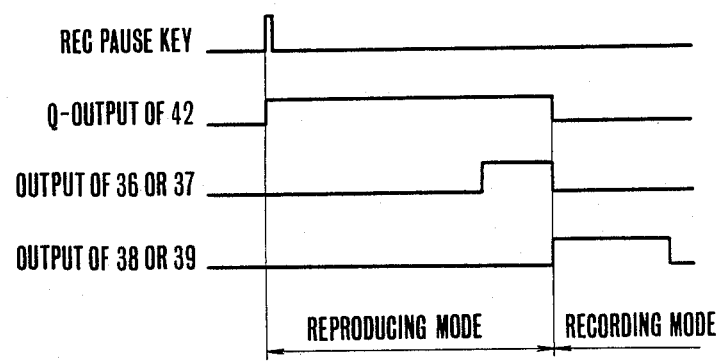
FIG. 9 is a timing chart showing the operation of the VTR of FIG. 3.

FIG. 9 is a timing chart showing the timing of signals produced from the flip-flop 42, the differential amplifiers 36 and 37 and the delay circuits 38 and 39 of the circuit arrangement shown in FIG. 3.

In the case described, a concatenated recording operation is performed in the SP mode on a record pattern formed in the LP mode. However, the same advantageous effect is also attainable by performing concatenated recording at the same tape speed as the speed at which existing recording tracks are formed.

Figure 10:
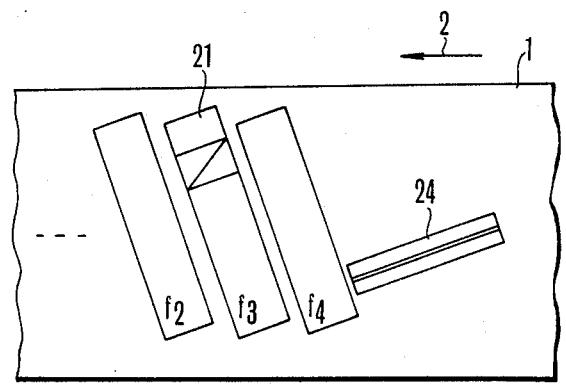
FIG. 10 further shows the tape tracing manner in which the VTR of FIG. 3 performs concatenated recording.

FIG. 10 shows a case wherein a concatenated recording operation is performed in the SP mode on existing recording tracks formed in the SP mode. In this case, the tracking control is performed by generating local pilot signals in rotation in the same sequence of frequencies f1, f2, f3 and f4 as in normal reproduction. Therefore, with the switch 32a kept in an OFF state and the switch 32b in an ON state, a phase relation always obtains as shown in FIG. 10 at the concatenated part of the tape. Accordingly, concatenation can be neatly accomplished with the heads 21 and 22 brought into their recording mode a 1.5-field period after the detection output level of the signal reproduced by the FEH 24 becomes lower than the threshold voltage E1. In other words, again referring to FIG. 3, the system controller 46 does not supply any pulse signal to the S terminal of the flip-flop 42 even if a recording pause cancelling instruction is given from the operation part 58. Further, when the FEH 24 begins to trace the non-recorded part of the tape, the output level of the differential amplifier 36 becomes high. Then, after the lapse of the 1.5-field period following it, the heads 21 and 22 begin to record a video signal on the non-recorded part.

Further, concatenated recording can be likewise smoothly accomplished by using the signal reproduced by the FEH 24 even in cases where the LP mode is replaced with the EP mode.

Figure 11:
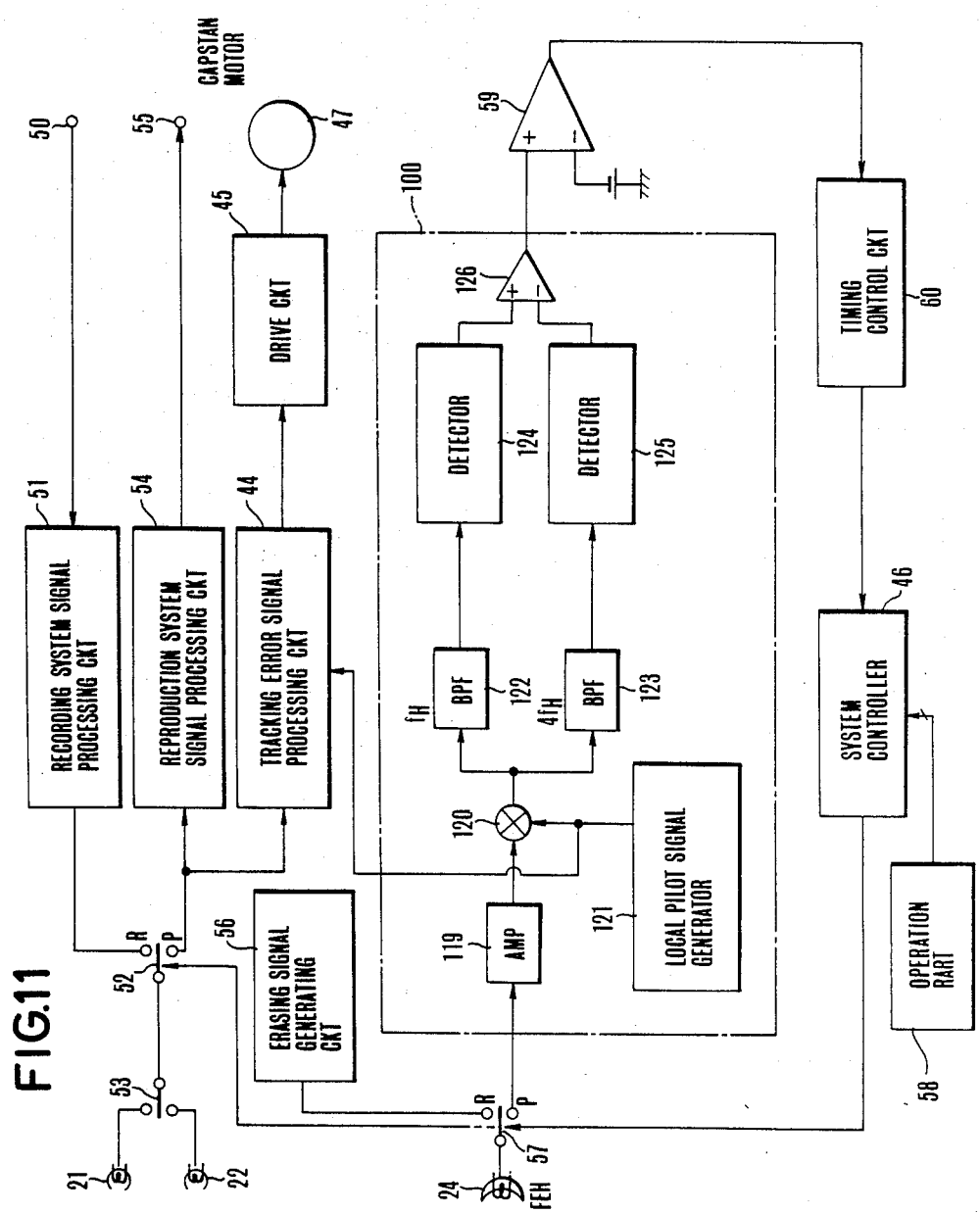
FIG. 11 is a diagram showing the arrangement of a VTR as another embodiment of this invention.
Figure 12:
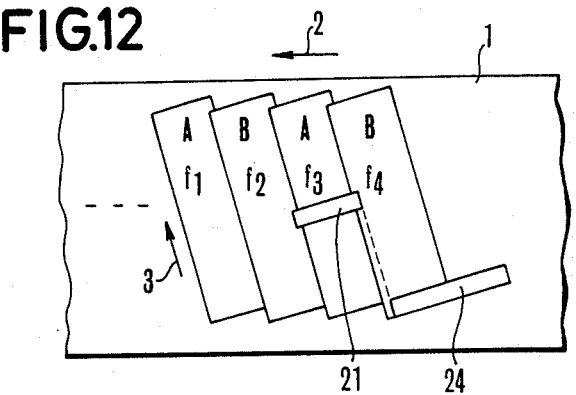
FIG. 12 shows the tape tracing manner of the VTR of FIG. 11 in performing concatenated recording.

FIG. 11 is a block diagram showing the arrangement of essential parts of a VTR embodying this invention as another embodiment. FIG. 12 shows a positional relation which obtains between the heads included in the circuit arrangement shown in FIG. 11 when a new signal is to be recorded continuously from the end of existing recording tracks.

Referring to FIG. 11, the same component elements as those shown in FIG. 3 are indicated by the same reference numerals. This embodiment includes a recording start timing determining circuit 100; a reproduction amplifier (AMP) 119; a multiplier 120; a local pilot signal generator 121; a band-pass filter (BPF) 122 which is arranged to separate a frequency component of fH; a BPF 123 which is arranged to separate a frequency component of 4 fH; detectors 124 and 125; a comparator 126; a differential amplifier 59; and a timing control circuit 60. Referring to FIG. 12, among existing recording tracks, a track formed by the head B is the last track of the existing record. FIG. 12 shows timing immediately before recording a new signal continuously from the recorded track. When a pause instruction is given during a recording operation, the magnetic tape is rewound to a given extent and is temporarily brought to a stop after completion of recording on a track which has the pilot signal of frequency f4 recorded therein. Following this, when the pause is cancelled, the connecting position of the switch 52 is shifted to one side P thereof and the magnetic tape is allowed to travel at the normal speed under tracking control. Then, the position of the switch 57 which is shown in FIG. 11 is also shifted to one side P thereof to bring the FEH 24 into a reproducing mode. The FEH 24 reproduces pilot signals while the tape is travelling. The reproduced pilot signal obtained from the FEH 24 is amplified by the amplifier 119. Meanwhile, the local pilot signal generator 121 generates local pilot signals for multiplying thereby the pilot signals which are reproduced by the recording/reproducing heads 21 and 22 at the tracking error signal processing circuit 44. The local pilot signal thus generated is multiplied at the multiplier 120 by the output of the above-stated amplifier 119. The outputs of the BPFs 122 and 123 are detected and rectified by the detectors 124 and 125 respectively. Signal components of frequencies fH and 4 fH are then supplied to the comparator 126. The comparator 126 then produces a signal representing a level difference between the signal components fH and 4 fH. The level difference signal is supplied to the differential amplifier 59.

With the recording operation brought to a pause and then with the pause cancelled, the tape is allowed to begin to travel under tracking control which is performed according to reproduced signals obtained from the heads 21 and 22 arranged as shown in FIGS. 4(A) and 4(B). Then, if these heads are in a phase relation which is as shown in FIG. 12, the multiplier 120 which receives the signal reproduced by the FEH 24 while the head 21 is tracing the tape produces an output according to the amount of the frequency component fH and that of another frequency component 4 fH. Therefore, in that instance, the output of the multiplier 120 is approximately ½ Vcc which is the half of the power supply voltage Vcc.

With the tape having further travelling, when the half of the width of the FEH 24 comes to reproduce the non-recorded part of the tape, it is only the signal component of frequency f4 that is reproducible from the recorded part. Then, in the output of the multiplier 120 obtained while the head 21 is tracing the tape, the component of frequency fH becomes larger and the component of frequency 4 fH becomes zero as the signal component of frequency f1 is no longer obtainable. As a result, the output level of the comparator 126 becomes high. This high level signal is detected by the differential amplifier 59. Then, the timing control circuit 60 acts to delay the output of the differential amplifier 60 until arrival of time for the start of tracing by the head A. After this delay, the output of the differential amplifier 59 is supplied to the system controller 46 to bring thereby the VTR into the recording mode. This arrangement effectively eliminates the possibility of having an overlapped recording part to ensure no deterioration in the quality of picture when the concatenated part is reproduced.

The pilot signals reproduced by the FEH 24 while the head 22 is tracing the tape are of the frequencies f2 and f3 when the local pilot signal frequency is f2 and are of frequencies f4 and f1 when the local pilot signal frequency is f4. Therefore, the output of the multiplier 120 obtained while the head 22 is tracing the tape mainly consists of the frequency component of 3 fH and thus the output level of the comparator 126 never becomes high.

Figure 13:
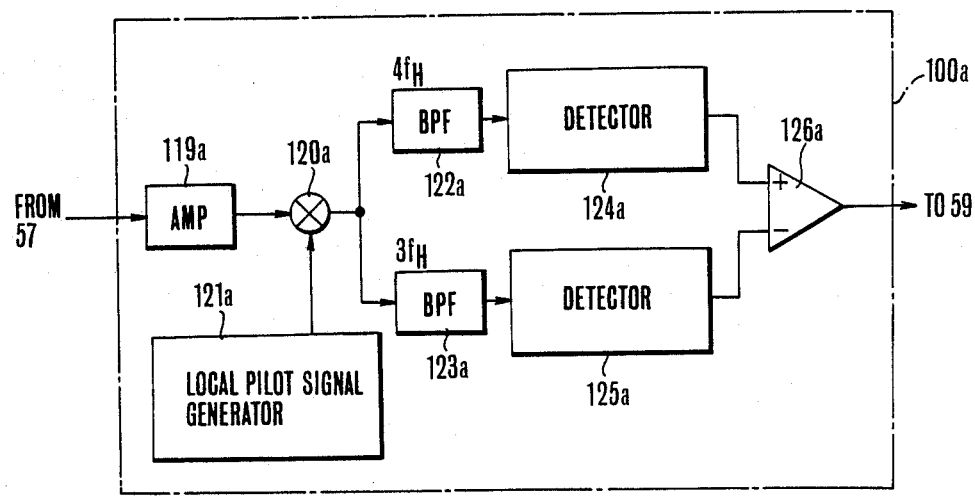
FIG. 13 is a diagram showing by way of example a modification of the arrangement of a component included in the VTR of FIG. 11.
Figure 14:
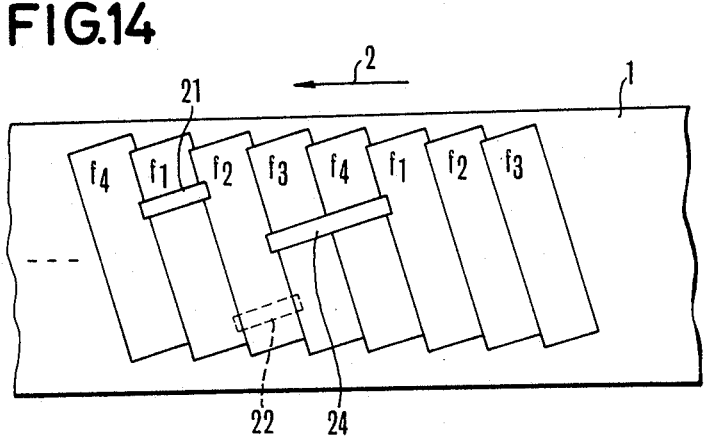
FIG. 14 shows the tape tracing manner of the modification example of FIG. 13 performing concatenated recording.

FIG. 13 shows by way of example a modification of the circuit arrangement of FIG. 11. In the case of this modification, the FEH 24 and heads 21 and 22 are in a phase relation as shown in FIG. 14. In FIG. 13, the circuit elements correspond to those of FIG. 11 are indicated by the same reference numerals with a letter "a" suffixed to each of these numerals. The modification shown in FIG. 13 is also capable of attaining the same purpose as the VTR of FIG. 11 by comparing the frequency components 4 fH and 3 fH derived from the reproduction output of the FEH 24. In this case, the track to be last formed immediately before completion of recording is arranged to be a track in which the pilot signal of frequency f3 is recorded.

More specifically, the arrangement is as follows: Referring to FIG. 14, when the FEH 24 is half reproducing a non-recorded part, it is only the signal component of frequency f3 that is reproduced from the recorded part of the tape. Therefore, while the head 21 is tracing the tape, the component of frequency 4 fH increases within the output of the multiplier 120a while the component of frequency 3 fH of the output becomes zero as no signal component of frequency f4 is reproduced. As a result, the output level of the comparator 126a becomes high. This high level signal is detected at the differential amplifier 59. The output of the amplifier 59 is delayed by the timing control circuit 60 until the head B begins to trace the tape after the lapse of the 2.5-field period. The delayed output is then supplied to the system controller 46 to bring thereby the VTR into the recording mode. This arrangement eliminates the possibility of having an overlapped record part.

In this case, while the head 22 is tracing the tape, the pilot signals reproduced by the FEH 24 are of the frequencies f3 and f4 when the local pilot signal is of the frequency f2 and are of the frequencies f1 and f2 when the local pilot signal is of the frequency f4. Therefore, the output of the multiplier 120a contains frequency components 2 fH and 3 fH in large amounts. As a result, the output level of the comparator 126a becomes low.

Further, even if the phase relations shown in FIGS. 12 and 14 are not obtained due to insufficient precision in the mounted height of the FEH 24, the operation can be performed in the same menner as described above by adjusting the gain of the BPF and the threshold value of the differential amplifier 59 shown in FIGS. 11 and 13.

In the embodiment described, signals recorded in tracks are reproduced by the FEH. The timing for the start of recording is determined according to the reproduction output of the FEH. The invented arrangement eliminates the possibility of having any overlapped recording at a concatenated part between an existing record and a newly recorded part and also prevents a recording track pattern from being disturbed there.

What is claimed is:

1. An information signal recording apparatus comprising:
   (a) a first rotary head which is arranged to record an information signal on a recording medium;
   (b) a second rotary head which is arranged to erase the information signal recorded on said recording medium; and
   (c) determining means for determining timing for the start of recording the information signal by said first rotary head on the basis of a signal reproduced by the second rotary head, said determining means including a detecting circuit which detects the level of a signal reproduced by said second rotary head and a comparison circuit which compares the level detected by said detecting circuit with a predetermined level.

2. An apparatus according to claim 1, wherein said second rotary head is arranged to precede said first rotary head in tracing on said recording medium.

3. An apparatus according to claim 1, wherein a width of said second rotary head is wider than that of said first rotary head.

4. An apparatus according to claim 1, wherein said determining means further includes a delay circuit which is arranged to delay the output of said comparison circuit for a period of time determined according to a difference in recording medium tracing timing between said first and second rotary heads.

5. An apparatus according to claim 4, wherein said comparison circuit includes a first comparator which is arranged to compare a first predetermined level with the level detected by said detecting circuit for the purpose of detecting that the whole width of said second rotary head has come to trace a non-recorded part of said recording medium and a second comparator which is arranged to compare a second predetermined level with the level detected by said detecting circuit for the purpose of detecting that at least a predetermined portion of width of said second rotary head which is less than the whole width thereof has come to trace said non-recorded part, said second predetermined level being higher than said first predetermined level.

6. An apparatus according to claim 5, wherein said delay circuit includes a first delayer which is arranged to delay the output of said first comparator for a first predetermined period of time and a second delayer which is arranged to delay the output of said second comparator for a second predetermined period of time, said second predetermined period being shorter than said first predetermined period.

7. An apparatus according to claim 6, wherein said determining means further includes a logical sum circuit which is arranged to obtain a logical sum of the output of said first delayer and that of said second delayer.

8. An information signal recording apparatus arranged to record pilot signals for tracking control which are superimposed on the information signal on a recording medium, comprising;
   (a) a first rotary head which is arranged to record the information signal the pilot signals on said recording medium;
   (b) a second rotary head which is arranged to erase the information signal and the pilot signals recorded on said recording medium; and
   (c) determining means for determining timing for the start of recording the information signal and the pilot signals by said first rotary head on the basis of the level of the pilot signals reproduced by the second rotary head.

9. An apparatus according to claim 8, wherein said pilot signals for tracking control includes pilot signals of a plurality of kinds having different frequencies; and said determining means includes detecting means for detecting that the pilot signal of only one of said plurality of kinds is reproduced by said second rotary head.

10. An apparatus according to claim 9, wherein said detecting means includes a circuit which is arranged to generate in rotation reference signals of a plurality of kinds having different frequencies corresponding to those of said pilot signals of said plurality of kinds and a circuit which is arranged to perform a multiplying operation on the output of said reference signal generating circuit and the signal reproduced by said second rotary head.

11. An information signal recording apparatus comprising:
   (a) a first rotary head which is arranged to record an information signal on a tape-shaped recording medium;
   (b) a second rotary head which is arranged to erase the information signal recorded on said recording medium;
   (c) a first manually operable means for instructing an information signal recording operation to make a pause;
   (d) moving means for longitudinally moving said tape-shaped recording medium;
   (e) moving operation control means for causing said moving means to move said tape-shaped recording medium to a given extent in the direction reverse to the medium moving direction for recording in response to the operation of said first manually operable means; and
   (f) determining means for determining timing for the re-start of recording the information signal after the operation of said first manually operable means by said first roatry head on basis of a signal reproduced by the second rotary head.

12. An apparatus according to claim 11, further comprising a second manually operable means for concelling the pause of said recording operation; and means for rendering said determining means operative in response to the operation of said second manually operable means.

13. An apparatus arranged to record pilot signals of a plurality of different kinds in recurrent rotation along with information signal, one in every recording track, comprising:
   (a) a first rotary head arranged to record said information signal on a recording medium;
   (b) a second rotary head arranged to trace the surface of said recording medium prior to said first rotary head, the head width of said second rotary head being wider than that of said first rotary head; and
   (c) determining means for determining timing for the start of recording said information signal by said first rotary head on the basis of said pilot signals reproduced by said second rotary head.

14. An apparatus according to claim 13, wherein said determining means includes detecting means for detecting that only one of said plurality of kinds of pilot signals is reproduced by said second rotary head.

15. An apparatus according to claim 14, wherein said determining means further includes delay means for delaying the output of said detecting means for a period of time determined according to a difference in timing for tracing said recording medium between said first and second rotary heads.

16. An apparatus according to claim 14, wherein said detecting means includes a circuit arranged to generate in recurrent rotation reference signals of a plurality of kinds having different frequencies corresponding to said pilot signals of said plurality of kinds.

17. An apparatus according to claim 16, further comprising means for controlling the position of said first rotary head and that of said recording medium relative to each other by using said pilot signals reproduced by said first rotary head and said reference signals generated by said reference signal generating circuit.

18. An apparatus according to claim 16, wherein said detecting means further includes a circuit arranged to multiply the signal reproduced by said second rotary head by said reference signal; means for separating signals of two different predetermined frequencies from the output of said multiplying circuit; and a circuit arranged to compare the levels of said signals of two different predetermined frequencies.

* * * * *